UNITED STATES PATENT OFFICE 2,406,590

METHOD OF PREPARING ALLYL AND METH-ALLYL ETHER ESTERS

Gaetano F. D'Alelio, Northampton, Mass., assignor to General Electric Company, a corporation of New York No Drawing. Application June 28, 1944,
Serial No. 542,599

7 Claims. (Cl. 260—484)

This invention relates generally to the preparation of new chemical compounds. More particularly the present invention is directed to the preparation of allyl and methallyl ether esters which may be polymerized alone or with other polymerizable compounds to yield new and useful resinous products.

The chemical compounds produced in accordance with this invention may be represented graphically by the general formula

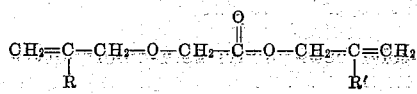

wherein R and R' may each be a member of the class consisting of hydrogen and the methyl radical. Thus in the formula R may be hydrogen and R' may be the methyl radical or vice versa. Again R and R' may both be hydrogen or both may be the methyl radical.

The allyl and methallyl ether esters may be used as intermediates in the preparation of other compounds and are especially valuable in the preparation of synthetic resinous compositions. Thus, they may be polymerized alone or with other polymerizable materials to form resinous products exhibiting varying degrees of insolubility and infusibility as more completely disclosed and specifically claimed in my copending application, Serial No. 542,600, filed concurrently herewith, and assigned to the assignee of the present invention.

By adding varying amounts of these allyl and methallyl ether esters to other polymerizable materials, bubble-free castings are obtained which, in most cases, are infusible and insoluble. On the other hand, castings prepared from such polymerizable materials alone, i. e., without the use of the ether ester derivatives, usually yield products which are filled with bubbles and are thermoplastic. The ether esters thus exhibit a definite cross-linking property.

Several methods may be employed to produce the above-described ether esters. If it is desired that the two terminal groups of the compound (that is, the allyl group or the methallyl group) be alike, then the ether ester derivatives are preferably prepared by reacting sufficient allyl or methallyl alcohol with an alpha-halogenated acetic acid in the presence of a suitable hydrohalide acceptor or reagent which acts as a base. If the terminal groups of the compounds are to be different, e. g., one allyl and the other methallyl, or vice versa, then allyloxyacetic acid or methallyloxyacetic acid is first formed and thereafter the ether acid is esterified to obtain the corresponding ester derivative.

Illustrative examples of hydrohalide acceptors, or reagents which act as bases, that may be used are the inorganic bases, e. g., the alkali-metal hydroxides, such as sodium hydroxide, potassium hydroxide, etc., alkaline-earth metal hydroxides, e. g., calcium hydroxide, barium hydroxide, etc., the carbonates of such bases, and organic bases, for instance, trimethyl amine, tributyl amine, dimethyl aniline, pyridine, quinoline, etc. I prefer to use sodium hydroxide as the hydrohalide acceptor.

The reaction between the allyl or methallyl alcohol and the halogenated acetic acid may be carried out in any suitable manner, but preferably is effected in the presence of a suitable solvent or mixture of solvents. Although various solvents and solvent mixtures may be employed, for economic reasons and because of its eminent suitability, I prefer to use water. The reaction may be carried out under a variety of temperature and pressure conditions, for instance at normal, sub-normal or at elevated temperatures, and at atmospheric, sub-atmospheric or super-atmospheric pressures.

In order that those skilled in the art better may understand how the present invention may be practiced, the following examples are given by way of illustration and not by way of limitation. All parts are by weight.

*Example 1*

This example illustrates the preparation of allyl allyloxyacetate, the formula for which is $$CH_2=CH-CH_2-O-CH_2-\overset{O}{\underset{\|}{C}}-O-CH_2-CH=CH_2$$

|  | Parts | Mol ratio |
|---|---|---|
| Chloroacetic acid | 142 | 1 |
| Allyl alcohol | 261 | 3 |
| Sodium hydroxide | 123 | 2 |
| Water | 50 |  |

The chloroacetic acid was added slowly at room temperature (about 25° C.) to a stirred mixture containing the allyl alcohol, sodium hydroxide and water. A very vigorous reaction resulted and a solid material precipitated. The reaction mixture was refluxed at its boiling temperature for four hours. After allowing the mixture to cool, the precipitate was removed by filtration, leaving behind the excess allyl alcohol and the sodium allyloxyacetate. The filtrate was then acidified with 149 parts of aqueous 37.1% hydrochloric acid which converted the sodium allyloxyacetate to allyloxyacetic acid and created an acid medium for the esterification process which followed. Approximately 150 parts benzene were added to the filtrate, and the water, resulting from the esterification process and from the initial addition, was removed in the form of an azeotropic mixture with the benzene in a continuous water-removal esterification apparatus. The elimination of water from the system required twelve hours of continuous boiling.

Theoretically only two mols of allyl alcohol are necessary for the reaction: one mol to obtain the ether acid and another mol to yield the ether ester. However, an excess of allyl alcohol is employed to increase the yield of the ester.

A yield of 91 parts allyl allyloxyacetate was obtained which boiled at 95°–97° C. at 18 mm. pressure and had a refractive index of 1.4435 at 20° C. The molar refractivity was 41.35 (calculated value=41.51).

Instead of adding all the allyl alcohol at the start, the allyloxyacetic acid may be formed first by reacting only one mol allyl alcohol with one mol of chloroacetic acid by the above described method. The allyloxyacetic acid may then be esterified by adding the remainder of the allyl alcohol at the same time as the benzene.

*Example 2*

Methallyl methallyloxyacetate, the formula for which is

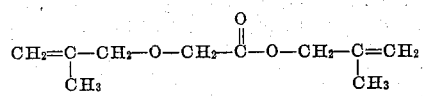

is prepared in essentially the same manner as described under Example 1 with the exception that 324 parts methallyl alcohol are used instead of 261 parts allyl alcohol.

*Example 3*

Allyl methallyloxyacetate, the formula for which is

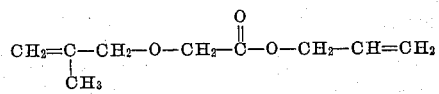

is prepared in accordance with the procedure of Example 1 except that 72 parts (1 mol) methallyl alcohol are first reacted with 142 parts chloroacetic acid, 50 parts water and 123 parts sodium hydroxide to yield sodium methallyloxyacetate. Upon acidification the methallyloxyacetic acid obtained is esterified, as in Example 1, with 116 parts (2 mols) allyl alcohol to yield the allyl methallyloxyacetate.

*Example 4*

Methallyl allyloxyacetate, the formula for which is

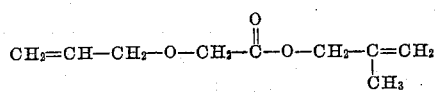

is prepared as in Example 1 except that 58 parts (1 mol) allyl alcohol are first reacted with 142 parts chloroacetic acid, 50 parts water and 123 parts sodium hydroxide to yield sodium allyloxyacetate. Upon acidification, the allyloxyacetic acid obtained is esterified, as in Example 1, with 144 parts (2 mols) methallyl alcohol to yield methallyl allyloxyacetate.

Instead of using allyl alcohol or methallyl alcohol in separate portions as disclosed in the above examples, a mixture of allyl and methallyl alcohols may be employed.

Although in the above examples only chloroacetic acid is employed, other mono-halogenated acetic acids and water-soluble salts of halo-alkyl monobasic acids may be employed, for instance chloroacetic acid, bromoacetic acid and iodoacetic acid, and the alkali-metal and ammonium salts of such acids, e. g., the sodium, potassium, lithium, etc., salts thereof. Mono-halogenated monobasic acids other than mono-halogenated acetic acid and water-soluble salts thereof may be employed in a similar manner to obtain other allyl and methallyl ether esters. Illustrative examples of these are:

Alpha-chloropropionic acid
Beta-chloropropionic acid
Alpha-bromopropionic acid
Beta-bromopropionic acid
Alpha-iodopropionic acid
Alpha-chlorobutyric acid
Alpha-chloro isobutyric acid
Beta-chlorobutyric acid
Beta-chloro isobutyric acid
Alpha-bromo isobutyric acid
Phenyl chloroacetic acid
Alpha-chloropentanoic acid
Beta-chloropentanoic acid
Beta-iodopropionic acid
Alpha-tolyl beta-phenyl beta-chlorobutyric acid
Alpha-naphthyl beta-chloro-phenyl beta-bromo butyric acid
Beta-iodopentanoic acid
Alpha-benzyl alpha-cyclopentyl beta, beta'-dinaphthyl beta-iodo propionic acid and the alkali-metal and ammonium salts of halo-alkyl monobasic acids such as above mentioned by way of illustration, for example, the sodium, potassium, lithium, etc., salts of such halo-alkyl monobasic acids.

What I claim as new and desire to secure by Letters Patent of the United States is:

1. The method of producing allyl allyloxyacetate which comprises preparing an aqueous mixture containing (1) allyl alcohol, (2) chloroacetic acid, and (3) a reagent which acts as a base, said allyl alcohol and chloroacetic acid being present in the said mixture in the ratio of at least two mols of the former per mol of the latter, effecting reaction between the said reactants in the said aqueous mixture to obtain a salt of allyloxyacetic acid, thereafter acidifying the reaction mass containing the said salt to yield allyloxyacetic acid, effecting further reaction in acid medium to obtain a reaction mass containing allyl allyloxyacetate, while removing water formed during esterification, and isolating allyl allyloxyacetate from the said reaction mass.

2. The method of producing methallyl methallyloxyacetate which comprises preparing an aqueous mixture containing (1) methallyl alcohol, (2) chloroacetic acid, and (3) a reagent which acts as a base, said methallyl alcohol and chloroacetic acid being present in the said mixture in the ratio of at least two mols of the former per mol of the latter, effecting reaction between the said reactants in the said aqueous mixture to obtain a salt of methallyloxyacetic acid, thereafter acidifying the reaction mass containing the said salt to yield methallyloxyacetic acid, effecting further reaction in acid medium to obtain a reaction mass containing methallyl methallyloxyacetate, while removing water formed during esterification, and isolating methallyl methallyloxyacetate from the said reaction mass.

3. The method of producing methallyl allyloxyacetate which comprises preparing an aqueous mixture containing a reagent which acts as a base and equimolecular proportions of allyl alcohol and chloroacetic acid, effecting reaction between the said reactants in the said aqueous mixture to obtain a salt of allyloxyacetic acid, thereafter acidifying the reaction mass containing the said salt to yield allyloxyacetic acid, adding methallyl alcohol to the acidified reaction mass in an amount corresponding to one mol thereof, effecting esterification of the said allyloxyacetic acid with the said methallyl alcohol in said medium thereby to obtain a reaction mass containing methallyl allyloxyacetate, while removing water formed during esterification, and isolating methallyl allyloxyacetate from the said reaction mass.

4. The method of producing compounds corresponding to the formula

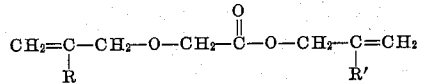

where R and R' are each a member of the class consisting of hydrogen and the methyl radical, which comprises preparing an aqueous mixture containing (1) a mono-halogenated acetic acid, (2) an allyl alcohol corresponding to the formula

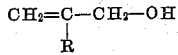

where R is a member of the class consisting of hydrogen and the methyl radical, and (3) a reagent which acts as a base, effecting reaction between the said reactants in the said aqueous mixture to obtain a salt of an allyloxyacetic acid, thereafter acidifying the reaction mass containing the said salt to form the free acid thereof, effecting esterification of said free acid with one of said alcohols, in acid medium while removing water formed during esterification, and separating the resulting ether ester from the said reaction mass.

5. A method as in claim 4 wherein the reagent which acts as a base is an alkali-metal hydroxide.

6. The method of producing allyl allyloxyacetate which comprises heating an aqueous mixture containing sodium hydroxide, allyl alcohol and chloroacetic acid in an amount corresponding to about two mols sodium hydroxide and about three mols allyl alcohol per mol chloroacetic acid thereby to obtain sodium allyloxyacetate, thereafter acidifying the reaction mass containing the said sodium allyloxyacetate to yield allyloxyacetic acid, effecting further reaction in acid medium to obtain a reaction mass containing allyl allyloxyacetate, while removing water formed during esterification, and separating the allyl allyloxyacetate from the said reaction mass.

7. The method of producing allyl allyloxyacetate which comprises adding chloroacetic acid slowly to a stirred mixture containing allyl alcohol, sodium hydroxide and water, the allyl alcohol and sodium hydroxide being present in the said mixture in an amount corresponding to about three mols allyl alcohol and about two mols sodium hydroxide per mol chloroacetic acid employed, heating the resulting aqueous mixture under reflux at the boiling temperature of the mass for a period sufficient to form sodium allyloxyacetate, filtering the cooled reaction mass to remove solid impurities, acidifying the filtrate containing sodium allyloxyacetate and excess allyl alcohol with an excess of an aqueous solution of hydrochloric acid thereby to form allyloxyacetic acid in acid aqueous solution, adding benzene to the filtrate, effecting reaction between the allyloxyacetic acid and allyl alcohol in acid medium while admixed with the benzene, and separating the resulting allyl allyloxyacetate from the reaction mass.

GAETANO F. D'ALELIO.